United States Patent
Gold et al.

(10) Patent No.: US 8,612,705 B2
(45) Date of Patent: Dec. 17, 2013

(54) MAKING A PHYSICAL COPY OF DATA AT A REMOTE STORAGE DEVICE

(75) Inventors: Stephen Gold, Fort Collins, CO (US); Alexandre Lenart, Palo Alto, CA (US)

(73) Assignee: Hewlett-Packard Development Company, L.P., Houston, TX (US)

( * ) Notice: Subject to any disclaimer, the term of this patent is extended or adjusted under 35 U.S.C. 154(b) by 305 days.

(21) Appl. No.: 13/260,104

(22) PCT Filed: Jul. 29, 2009

(86) PCT No.: PCT/US2009/052159
§ 371 (c)(1),
(2), (4) Date: Sep. 23, 2011

(87) PCT Pub. No.: WO2011/014167
PCT Pub. Date: Feb. 3, 2011

(65) Prior Publication Data
US 2012/0017059 A1    Jan. 19, 2012

(51) Int. Cl.
*G06F 12/16*    (2006.01)
(52) U.S. Cl.
USPC .................................. 711/162; 711/E12.103
(58) Field of Classification Search
USPC .......................................... 711/162, E12.103
See application file for complete search history.

(56) References Cited

U.S. PATENT DOCUMENTS

| | | | |
|---|---|---|---|
| 2004/0010669 A1 | 1/2004 | Nishimura et al. | |
| 2005/0114599 A1* | 5/2005 | Kasako et al. | 711/114 |
| 2007/0106709 A1 | 5/2007 | Augestein et al. | |
| 2007/0143371 A1 | 6/2007 | Kottomtharayil | |
| 2008/0177964 A1* | 7/2008 | Takahashi et al. | 711/162 |
| 2009/0193208 A1* | 7/2009 | Ozaki et al. | 711/162 |
| 2009/0193219 A1* | 7/2009 | Ohira et al. | 711/170 |
| 2011/0023046 A1* | 1/2011 | Gold et al. | 718/104 |
| 2011/0055501 A1* | 3/2011 | Wake | 711/162 |

OTHER PUBLICATIONS

International Search Report and Written Opinion, dated Apr. 27, 2010, 11 pages.

* cited by examiner

*Primary Examiner* — Hal Schnee

(57) ABSTRACT

Systems and methods relating to making a physical copy at a remote storage device of data on a local storage device in response to a command from a backup application operatively associated with the local storage device are disclosed. An exemplary method comprises replicating the data from the local storage device on the remote storage device. The method also comprises copying the data replicated at the remote storage device to a physical medium operatively associated with the remote storage device in response to a command from the backup application operatively associated with the local storage device.

13 Claims, 3 Drawing Sheets

MAKING A PHYSICAL COPY OF DATA AT A REMOTE STORAGE DEVICE

BACKGROUND

Storage devices commonly implement data replication operations, e.g., for data archiving and recovery. Data in virtual libraries may be replicated in another virtual library at a remote site. However, the backup application is not allowed to "see" the virtual library at the remote site because the backup application typically is not configured to handle two or more copies of the data (e g., having the same name, barcode, and/or contents, etc.) Accordingly, the backup application cannot access the remote virtual library.

Enterprise customers often desire to backup data at the remote site on a physical medium (e.g., a backup tape). The physical medium serves as a "carved-off" physical copy of the virtual library, and may be saved for use as an archive, test tape, etc. Because the physical medium is different from the virtual library (e.g., perhaps having a different barcode, size, cartridge type, retention time, or contents, etc.), the backup application needs to be used for copying the data from the virtual storage to the physical medium. Specifically, a virtual tape cannot be replicated on a physical tape if the virtual tape and physical tape have different characteristics (e.g., different sizes, different barcodes, and different contents). For example, multiple 100 GB virtual tapes may be copied onto a single 800 GB physical tape, and therefore the backup application must be in control. In other words, the virtual storage cannot simply be replicated to the physical medium. But since the backup application cannot handle both local and remote virtual libraries, other solutions are needed to copy a remote virtual library to a remote physical medium.

A virtual library may be used for "tape stacking" where multiple virtual tapes are copied onto a physical tape. But the physical tape cannot be restored directly by the backup application since the "stacked tape" is a custom format created by the virtual library, and thus would have to be "de-staged" back onto the virtual tape library store before restoring the data.

Another copy of the backup application may be installed at the remote site. This copy of the backup application can be used to access the remote virtual library and make copies to the remote physical medium. However, there requires multiple instances of the backup application to track both the virtual libraries and the backup on the physical medium. This approach also requires that the customer license separate backup applications.

DETAILED DESCRIPTION

Systems and methods are disclosed for making a physical copy at a remote storage device of data on a local storage device in response to a command from a backup application operatively associated with the local storage device. Briefly, a storage system is disclosed including a local storage device and a remote storage device. .A backup application maintains data (e.g., backup data for an enterprise) in a virtual storage library at the local storage device. The data can then be replicated using deduplication processes to another virtual storage library at the remote storage device.

It is desirable to periodically, or at some other time interval, replicate the data in the virtual storage library on a physical medium at the remote storage device (e.g., on a backup tape). As discussed above, however, backup applications typically are not configured to recognize copies of the backup data, and therefore a single instance of the backup application cannot be used to instruct a copy operation of the data at the remote storage device.

In exemplary embodiments, a copy engine is provided at the local storage device, and another copy engine is provided at the remote storage device. When the backup application issues a command to replicate data on the virtual storage device onto a physical storage medium, the local copy engine checks if the physical medium is located at the local storage device. If the physical medium is located at the local storage device, then the data is replicated locally. However, if the physical medium is not located at the local storage device, then the local copy engine issues the command to the remote copy engine. The remote copy engine checks if the physical medium is located at the remote storage device, and if so, the remote copy engine replicates the data on the physical storage medium at the remote storage device.

Accordingly, a single instance of the backup application operatively associated with the local storage device is able to issue a command for replicating the data in the local virtual storage library on a physical medium at a remote storage device. in addition, when implemented with deduplication technologies, the systems and methods described herein may be particularly advantageous for use over a low-bandwidth link between the local storage device and the remote storage device.

Before continuing, it is noted that exemplary operations described herein for making a physical copy at a remote storage device of data on a local storage device in response to a command from a backup application operatively associated with the local storage device may be embodied as logic instructions on one or more computer-readable medium. When executed by one or more processor, the logic instructions cause a general purpose computing device to be programmed as a special-purpose machine that implements the described operations.

Figure 1:
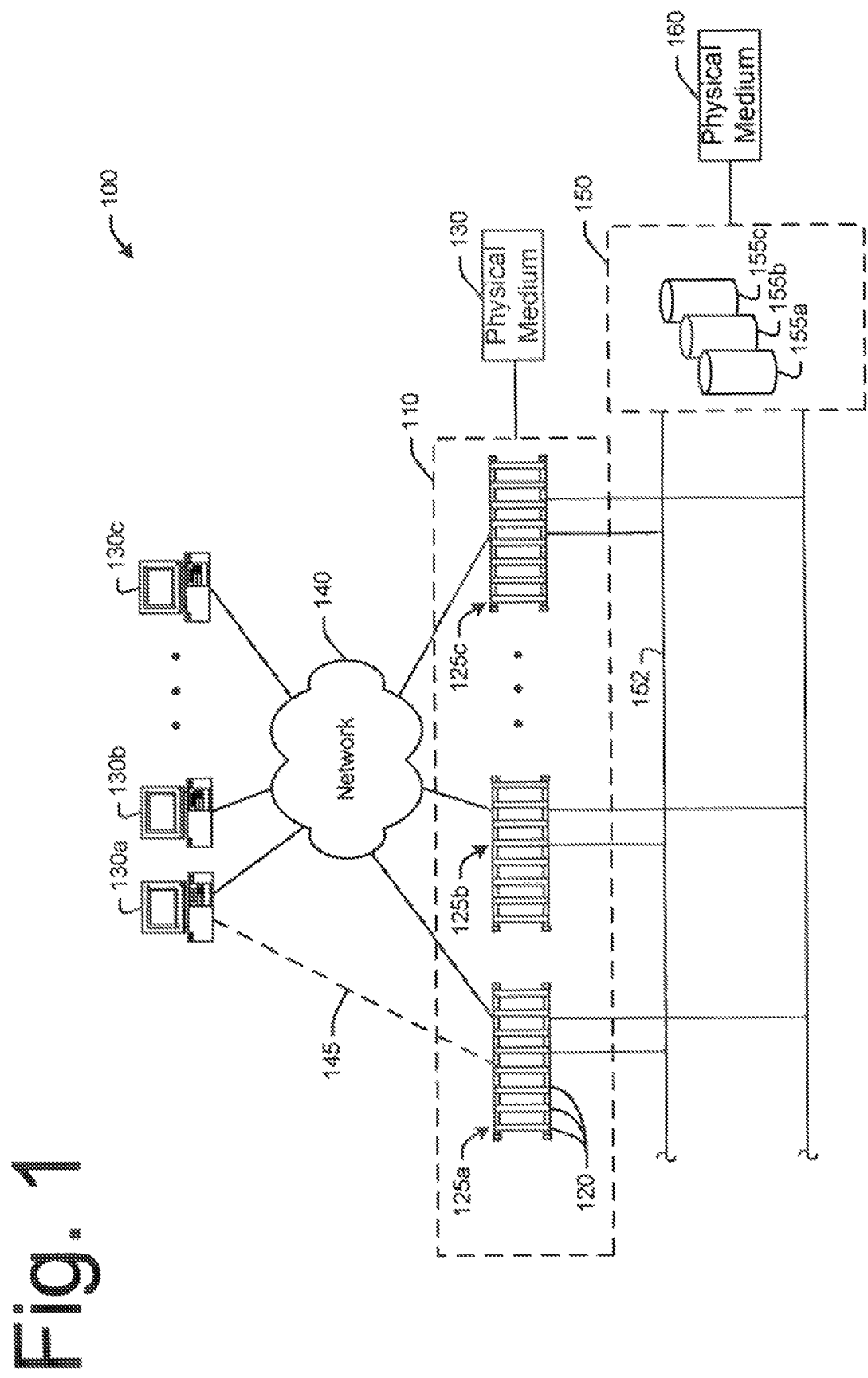
FIG. 1 is a high-level diagram showing an exemplary storage system including both local and remote storage.

FIG. 1 is a high-level diagram showing an exemplary storage system 100 including both local storage device 110 and remote storage device 150. The storage system 100 may include one or more storage cells 120. The storage cells 120 may be logically grouped into one or more virtual library storage (VLS) 125*a-c* (also referred to generally as local VLS 125) which may be accessed by one or more client computing device 130*a-c* (also referred to as "clients"), e.g., in an enterprise. In an exemplary embodiment, the clients 130*a-c* may be connected to storage system 100 via a communications network 140 and/or direct connection (illustrated by dashed line 145). The communications network 140 may include one or more local area network (LAN) and/or wide area network (WAN). The storage system 100 may present virtual libraries to clients via a unified management interface referred to herein as a backup application.

It is also noted that the terms "client computing device" and "client" as used herein refer to a computing device through which one or more users may access the storage system 100. The computing devices may include any of a wide variety of computing systems, such as stand-alone personal desktop or laptop computers (PC), workstations, personal digital assistants (PDAs), server computers, or appliances, to name only a few examples. Each of the computing devices may include memory, storage, and a degree of data processing capability at least sufficient to manage a connection to the storage system 100 via network 140 and/or direct connection 145.

In exemplary embodiments, the data is stored on one or more local VLS 125, Each local VLS 125 may include a logical grouping of storage cells. Although the storage cells 120 may reside at different locations within the storage system 100 (e.g., on one or more appliance), each local VLS 125 appears to the client(s) 130a-c as an individual storage devices. When a client 130a-c accesses the local VLS 125 (e.g., for a read/write operation), a coordinator coordinates transactions between the client 130a-c and data handlers for the virtual library.

Redundancy and recovery schemes may be utilized to safeguard against the failure of any cell(s) 120 in the storage system. In this regard, storage system 100 may communicatively couple the local storage device 110 to the remote storage device 150 (e.g., via a back-end network 152 or direct connection). In an exemplary embodiment, the back-end network 152 is a WAN and may have only limited bandwidth. Remote storage device 150 may be physically located in close proximity to the local storage device 110. Alternatively, at least a portion of the remote storage device 150 may be "off-site" or physically remote from the local storage device 110, e.g., to provide a further degree of data protection.

Remote storage device 150 may include one or more remote virtual library storage (VLS) 155a-c (also referred to generally as remote VLS 155) for replicating data stored on one or more of the storage cells 120 in the local VLS 125. In an exemplary embodiment all writes (e.g., by a client) to the local VLS 125 are logged in a batch for each of the storage cells 120. The batch may then be used to copy completed writes to the remote storage device 150 where the data is replicated at the remote VLS 155.

As discussed above, it is often desirable to periodically, or at some other time interval, replicate the data in the VLS 125 on one or more physical storage medium, such as a backup tape. The physical storage medium may reside locally 130 or remotely 160. According to exemplary embodiments described herein, the backup application is able to control replication to the physical medium even when the physical medium resides at the remote storage device 150, and even though the backup application is not "aware" of the transparent deduplication between the local and remote VLS. Such an embodiment enables the backup application to provide a single point of control of data at both the local VLS, and archived data on the physical medium.

The local VLS 125 copies data to a remote physical medium by first transparently replicating the data at the local VLS 125 to the remote VLS 155 at the remote storage device 150. In an exemplary embodiment, the replication may be by deduplication, which is particularly suitable for data replication over a low-bandwidth link.

In deduplication in virtual libraries, when a write completes at the local VLS the deduplication in the device determines what in that data is new/unique and what is duplicate to existing backups already stored in the device Thus the device "knows" for each virtual cartridge what is new data and what is already stored in the remote VLS. The replication can then (on a cartridge-by-cartridge basis) send over just the new data to the remote VLS along with references to the duplicate data that is already stored on the remote VLS.

When it is desired to make a physical copy of the data in the local VLS 125, the backup application issues a copy command to replicate the data in the local VLS 125 to the physical medium. This operation is transparently performed by copying the data at the remote VLS 155 of the same data on the local VLS 125 to the physical medium attached to the remote storage device 150, as may be better understood with reference to FIG. 2.

Figure 2:
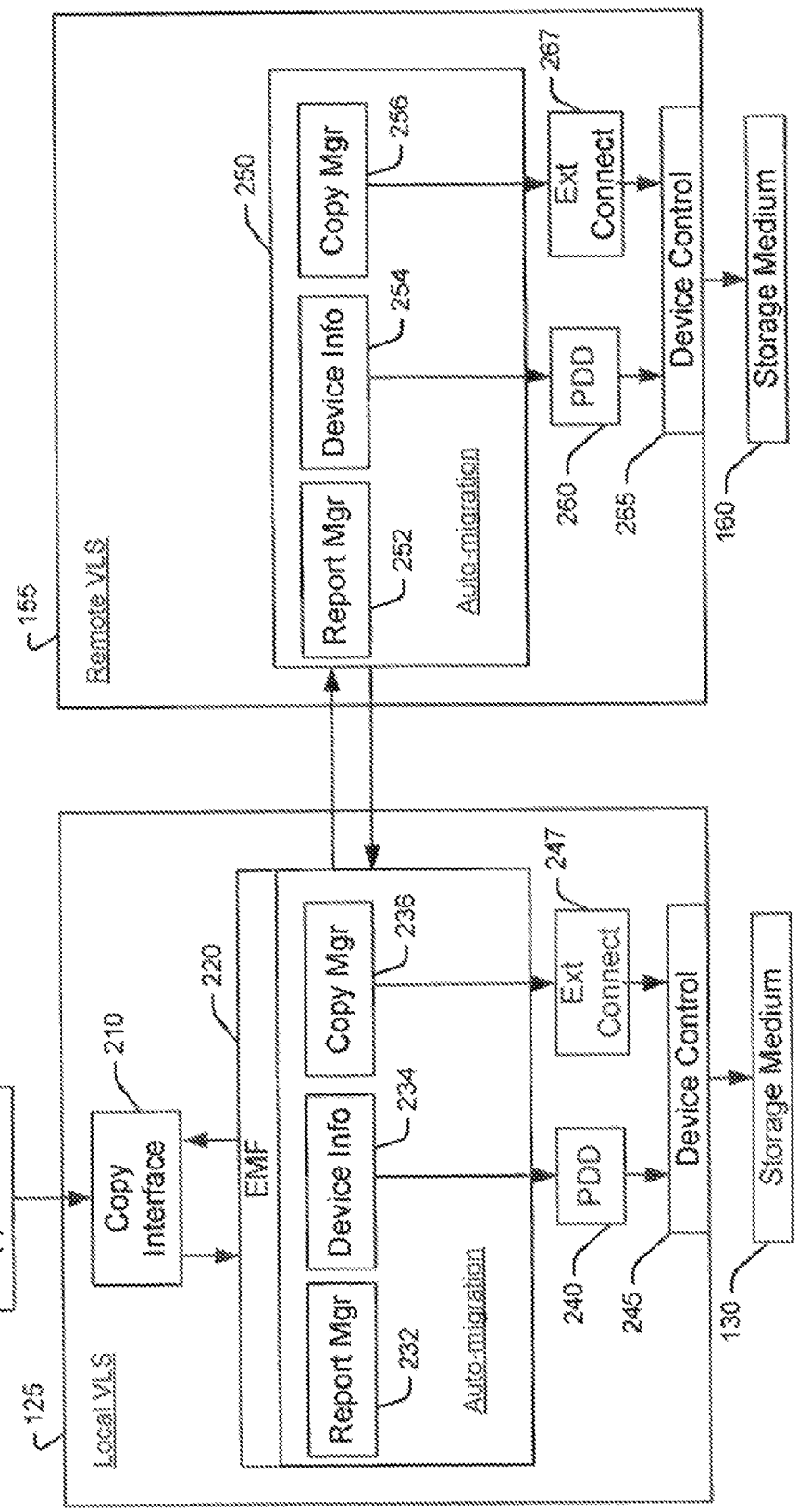
FIG. 2 shows an exemplary software architecture which may be implemented in the storage system for making a physical copy at a remote storage device of data on a local storage device in response to a command from a backup application operatively associated with the local storage device.

FIG. 2 shows an exemplary architecture which may be implemented for making a physical copy at a remote storage device of data on a local storage device in response to a command from a backup application 200 operatively associated with the local storage device. As previously discussed, the backup application 200 is operatively associated with the local VLS 125. Local VLS 125 may include a copy interface 210 communicatively coupled to an EMF 220. EMF is an internal SOAP API that abstracts the internal copy mechanisms so that multiple varieties of copy interface can be layered on top without having to change the lower levels every time a new copy interface is added.

The copy interface 210 may be implemented as a "Smart Copy" application programming interface (API). Smart Copy is a known out-of-band API that enables a backup application to control the copying of data from a virtual storage library to a physical medium connected to the virtual storage library. Exemplary implementations of the Smart Copy API include, but are not limited to, SMI-S (Storage Management Initiative Specification) copy services or NDMP (Network Data Management Protocol) tape copy.

SMI-S copy services may implement a Common Information Model Object Manager (CIMOM): CIMOM updates the redundancy configuration in the Common Information Model (CIM) object schema, and sends a CIM Event to the CJM proxy and then to a provider, which communicates with the EMF via an EMF client and an EMT Server.

NDMP tape copy may implement an NDMP server. The NDMP server also updates the redundancy configuration, and sends an event to the NDMP Interface Wrapper (NIW), which communicates with the EMF 230 via an EMF client and an EMF Server.

Both variations of Smart Copy basically perform the same operations, namely allowing the backup application to instruct the virtual library to copy one section of a specified virtual library to another section of a specified physical medium. If the physical medium 130 is operatively associated with (e.g., physically attached) to the local VLS 125, Smart Copy allows copying data directly from the local VLS 125 to the physical medium 130.

In order to copy data from the local VLS 125 to a physical medium 160 operatively associated with (e.g., physically attached) to the remote VLS 155, the copy interface 220 is enabled to hide all replication operations from the backup application 200 and that the physical medium 160 is remotely located. Accordingly, the backup application 200 is able to function as if the data is being replicated from the local VLS 125 to a local physical medium 130.

To enable this functionality, the copy interface 210 may communicate with the EMF 220 via an EMF client/server, e.g., using Soap requests and Soap events. The EMF 220 is an abstracted AN which converts requests by the backup application (e.g., SMI-S or NOMP requests) that are received at the copy interface 210 into a standardized common operation commands. For example, where the storage system is emulating tape storage, the common operation command may be "rewind," "position tape," "write filemark," "copy X blocks," and so forth.

The EMF 220 includes a local auto-migration layer 230. Local auto-migration layer 230 may be communicatively coupled with a remote auto-migration layer 250 at the remote VLS 155. The auto-migration layers 230, 250 provide a software link between the local VLS 125 and the remote VLS 155 so that the physical library software model (configuration, state, etc.) in the remote VLS 155 can receive commands and be maintained by the backup application 200 operatively associated with the local VLS 125. In other words, the software link between auto-migration layers 230, 250 enables the local VLS 125 to present a "ghost" physical library to the backup application 200 (e.g., presented via the graphical user interface (GUI)) and enable access to the remote VLS 155 and remote physical storage medium 160 through the local copy interface 210 as though the remote VLS 155 is a local physical library.

The software link between auto-migration layers 230, 250 enable copy operations (e.g., copy jobs, setup actions, etc) to be automatically transferred from the local VLS 125 to the remote VLS 155. in addition, when the backup application 200 issues a copy command to a physical medium, the software link provides a means for executing the copy command for the remote physical medium 160.

The software link between auto-migration layers 230, 250 is also integrated with deduplication technologies. In this regard, exemplary embodiments may be implemented over a low-bandwidth link, utilizing deduplication technology inside the virtual libraries to reduce the amount of data transferred over the link.

In addition, the auto-migration layers 230, 250 may be configured to wait for any active/pending replication jobs to complete before triggering the copy action at the device controls 260, 265. Waiting allows deduplication operations to complete and the remote VLS 155 to be updated with respect to the local VLS. After the active/pending replication jobs are completed and the remote VLS 155 is updated with respect to the local VLS, then the copy command can be executed to replicate the remote VLS 155 on the physical storage medium 160 operatively associated with the remote storage device. In this regard, the copy manager 236 may issue the copy command to the device control 245, 265 for the respective physical storage medium 130, 160, e.g., via an external connection 247, 267.

The auto-migration layers 230, 250 may also include a device information component 232, 252, respectively. The device information component 232, 252 is configured to report on the virtual and physical libraries operatively associated with (e.g., directly connected) to the respective local or remote storage devices In this regard, a Physical Device Discovery (POD) link 240, 260 may be provided between the auto-migration layer and the device control 245, 265 for the physical medium 130, 160. The PDD passes the configuration and current state information from the device control 245, 265 for the physical storage medium 130, 160 so that the physical storage medium 130, 160 appears as a "ghost" library on the local VLS 125, regardless of the actual location (local or remote) of the physical medium 130, 160. For example, the backup application 200 may initiate a copy operation on the local VLS 125 and request a copy from a local virtual tape "ABC001" to a physical tape "XYZ0001" in the remote physical medium 160. Accordingly, the physical tape "XYZ0001" is presented locally to the backup application 200 as a "ghost" physical library. These and other operations may be better understood with reference to FIG. 3.

Figure 3:
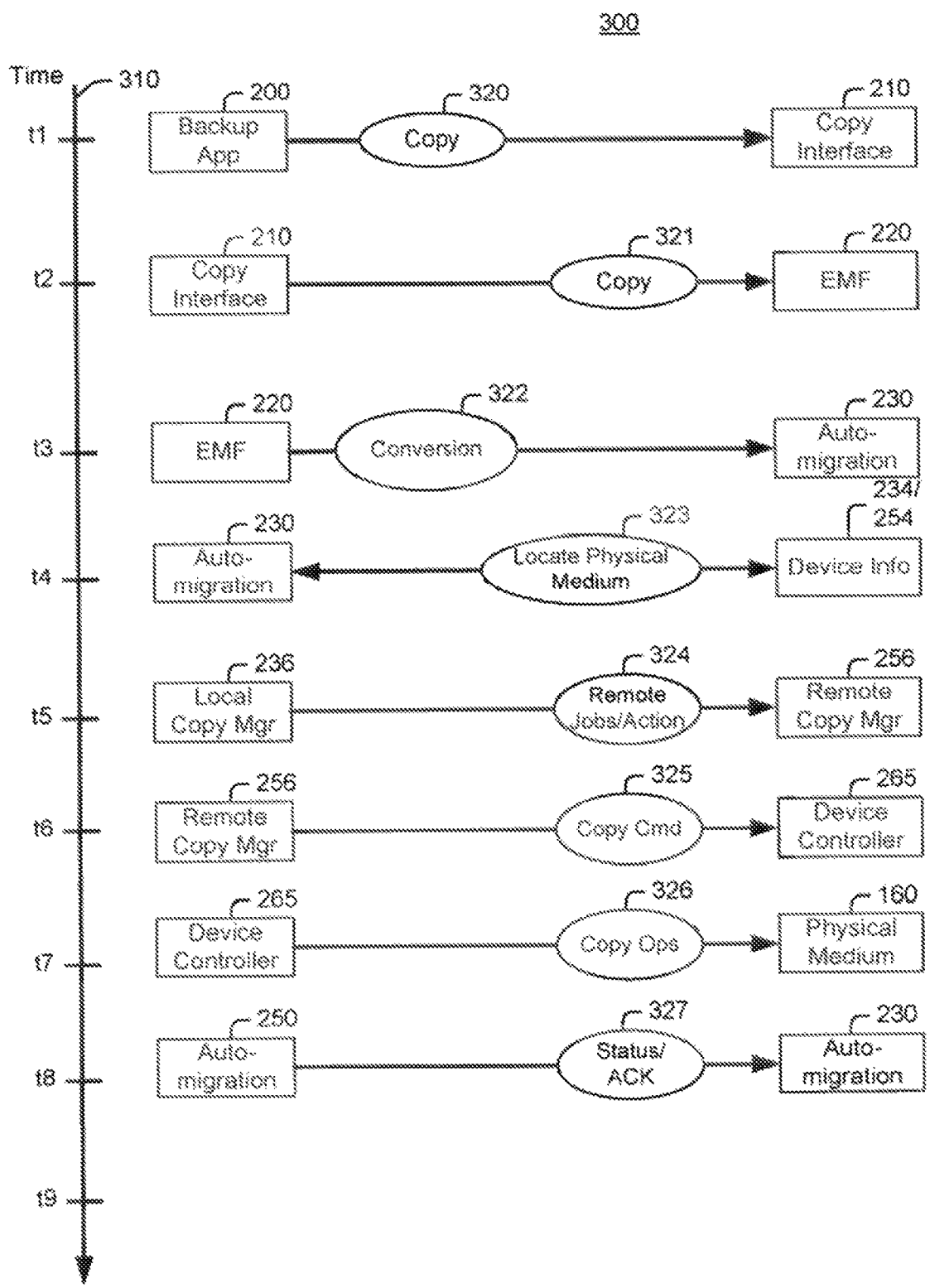
FIG. 3 is a timing diagram illustrating exemplary operations which may be implemented for making a physical copy at a remote storage device of data on a local storage device in response to a command from a backup application operatively associated with the local storage device.

FIG. 3 is a timing diagram 300 illustrating exemplary operations for making a physical copy at a remote storage device of data on a local storage device in response to a command from a backup application operatively associated with the local storage device. A timeline 310 is illustated along the left-hand margin of the drawing, with time progressing from the top of the page OD to the bottom of the page (t9). "Snapshots" at each time (t1-t9) illustrate device operations at the local and remote VLS 125, 155.

At time t1, the backup application 200 issues a copy command 320 to the copy interface 210 at the local storage device 125. At time t2, the copy command 321 is then passed into the EMF 220. At time t3, the EMF 220 converts 322 the requests (e.g., SM1-S or NDMP requests) into a standardized common operation command (e.g., tape commands such as "rewind," "position ape," "write filemark," "copy X blocks," and so forth).

At time t4, the physical medium 130 or 160 is located 323 by device info components 234, 254. When a copy command arrives in the local device auto-migration layer, and the target physical medium is in the "ghost" physical library that is actually attached to the remote device, the auto-migration waits for the local virtual storage to complete any active or pending replication. As discussed above, waiting. allows the deduplication operations to complete and the same data to reside in the remote device as exists on the local device so that the data can be accurately replicated on the physical medium 160. At time t5, the links established between the local copy manager 326 and the remote copy manager 256 may be used to send the copy operation to the remote storage device as a remote jobs/action request 324.

At time t6, the remote copy manager 256 passes the copy command 325 to the device controller 265 (e.g., a medium changer for a tape drive) for executing. For example, when executed, the copy command may instruct the device controller 265 to transfer data from one or more virtual storage library in the remote storage device to one or more physical medium, as illustrated at time t7.

It is noted that in exemplary embodiments, the local and/or remote VLS 125, 155 may be locked to prevent further 10 operations by the backup application until the copy command to the physical storage medium can be completed. After switching to a locked state, all further write and log requests by the backup application may be halted. The locked state may be established by temporarily suspending the 10 stream, e.g., by having the storage cells delay cache commits and write acknowledgements to the clients for a predetermined time. When replication completes, the data represents a complete image of all the writes which were completed on the local VLS and is ready to he transferred to the remote storage.

At time t8, the remote auto-migration layer 250 may also pass back a status on the copy command to the local auto-migration layer 230, which may in turn pass the status information back through the EMF 220 to the backup application 200.

It is noted that transactions, such as those just described, may be initiated to replicate data on a physical storage medium, e.g., periodically, based on a predetermined number of writes, a predetermined size, or when otherwise determined by the user. Determining when to replicate data on a physical storage medium may depend at least to some extent on design considerations. For example, industry standards for archiving data may recommend a periodic update frequency.

It is noted that the exemplary embodiments shown and described are provided for purposes of illustration and are not intended to be limiting. Still other embodiments are also contemplated for making a physical copy at a remote storage device of data on a local storage device in response to a command from a backup application operatively associated with the local storage device.

The invention claimed is:

1. A deduplication system for making a physical copy at a remote storage device of data on a local storage device in response to a command from a backup application operatively associated with the local storage device, comprising:
  a local copy engine operable to execute at the local storage device, the local copy engine being operable to communicate over a link with a remote copy engine at the remote storage device to replicate the data from the local storage device on the remote storage device; and
  wherein the local copy engine is configured to communicate with a job controller executing at the remote storage device, the local copy engine operable to communicate a command from the backup application to the job controller to copy the data replicated at the remote storage device to a physical medium operatively associated with the remote storage device;
  wherein in response to receiving a command from the backup application that specifies a target physical medium, the local copy engine checks for the target physical medium at the local storage device; and
  when the target physical medium is nonexistent at the local storage device, the local copy engine issues the command to the remote copy engine.

2. The system of claim 1, wherein the local storage device is connected to the remote storage device over a low-bandwidth link.

3. The system of claim 1, wherein the data is stored on the local storage device in a virtual storage library.

4. The system of claim 1, wherein the data is replicated on the remote storage device in a virtual storage library.

5. The system of claim 1, wherein the remote copy engine checks a state of the data replicated at the remote storage device in response to receiving the command from the local copy engine before copying the data to the physical medium.

6. The system of claim 5, wherein the remote copy engine only copies the data to the physical medium in response to receiving the command from the local copy engine if the state of the data replicated at the remote storage device indicates completion of a replicating operation.

7. The system of claim 1, wherein the remote copy engine locks the data replicated at the remote storage device in response to receiving the command from the local copy engine before copying the data to the physical medium.

8. A deduplication system for making a physical copy at a remote storage device of data on a local storage device in response to a command from a backup application operatively associated with the local storage device, comprising:
  a remote copy engine at the remote storage device operable to communicate over a link with a local copy engine at the local storage device to replicate the data from the local storage device on the remote storage device; and
  a job controller operable to execute at the remote storage device, the job controller operable to copy the data replicated at the remote storage device to a physical medium operatively associated with the remote storage device in response to receiving a command from the backup application via the local copy engine;
  wherein in response to receiving a command from the backup application that specifies a target physical medium, the local copy engine checks for the target physical medium at the local storage device; and
  when the target physical medium is nonexistent at the local storage device, the local copy engine issues the command to the remote copy engine.

9. The system of claim 8, wherein the remote copy engine checks a state of the data replicated at the remote storage device in response to receiving the command from the local copy engine before copying the data to the physical medium; and
  wherein the remote copy engine only copies the data to the physical medium in response to receiving the command from the local copy engine if the state of the data replicated at the remote storage device indicates completion of a replicating operation.

10. The system of claim 8, wherein the remote copy engine locks the data replicated at the remote storage device in response to receiving the command from the local copy engine before copying the data to the physical media medium.

11. A method for making a physical copy at a remote storage device of data on a local storage device in response to a command from a backup application operatively associated with the local storage device, comprising:
  replicating the data from the local storage device on the remote storage device;
  copying the data replicated at the remote storage device to a physical medium operatively associated with the remote storage device in response to a command from the backup application operatively associated with the local storage device;
  in response to receiving a command from the backup application that specifies a target physical medium, checking for the target physical medium at the local storage device; and
  when the target physical medium is nonexistent at the local storage device, issuing the command to the remote storage device.

12. The method of claim 11, further comprising:
  checking a state of the data replicated at the remote storage device before copying the data to the physical medium; and
  copying the data to the physical medium if the state of the data replicated at the remote storage device indicates completion of a replicating operation.

13. The method of claim 11, further comprising locking the data replicated at the remote storage device before copying the data to the physical medium.

* * * * *

UNITED STATES PATENT AND TRADEMARK OFFICE
CERTIFICATE OF CORRECTION

| | | |
|---|---|---|
| PATENT NO. | : 8,612,705 B2 | Page 1 of 1 |
| APPLICATION NO. | : 13/260104 | |
| DATED | : December 17, 2013 | |
| INVENTOR(S) | : Stephen Gold et al. | |

It is certified that error appears in the above-identified patent and that said Letters Patent is hereby corrected as shown below:

In the Claims

In column 8, line 26, in Claim 10, after "physical" delete "media".

Signed and Sealed this
Thirteenth Day of May, 2014

Michelle K. Lee
*Deputy Director of the United States Patent and Trademark Office*